Dec. 26, 1967 D. E. SIMS 3,360,730

APPARATUS PROVIDING A-M RADIO RECEPTION OF F-M

Filed Oct. 16, 1964

INVENTOR.
DAVID E. SIMS

BY Lockwood, Woodard, Smith & Weikart
Attorneys

United States Patent Office 3,360,730

Patented Dec. 26, 1967

3,360,730

APPARATUS PROVIDING A-M RADIO RECEPTION OF F-M

David E. Sims, Indianapolis, Ind., assignor of one-half to James E. Smith, and one-half to Eugene E. Williams, Indianapolis, Ind.

Filed Oct. 16, 1964, Ser. No. 404,410
6 Claims. (Cl. 325—315)

This invention relates generally to radio receiving apparatus and more particularly to a device receiving frequency modulation (F-M) radio signals and providing a conversion thereof with a wireless coupling to a standard amplitude modulation (A-M) radio receiver operating on the normal broadcast band.

Many converters are known for reception of F-M signals and cooperation with A-M receivers so that the intelligence carried in F-M transmissions can be produced by the use of standard A-M receivers. However, these devices usually have been characterized by considerable size, complexity, and expense. Usually they have required some plug-in arrangement for connection to the A-M receiver.

It is, therefore, a general object of the present invention to provide an improved device enabling the use of A-M receivers for producing information transmitted by F-M.

A further object is to provide a device of very simple, inexpensive, and compact construction.

A further object is to provide a device requiring no direct connection between the F-M receiver and the A-M receiver.

Described briefly, a typical embodiment of the present invention employs a converter unit having an antenna connected to an input circuit tuned to the F-M radio frequency to be received. The tuned circuit output is coupled to the base of a radio frequency amplifier and mixer transistor having an input to its emitter from a crystal control oscillator to provide an output from the transistor at an intermediate frequency tunable by a standard A-M receiver at the lower end of the broadcast band. The output of the transistor is coupled to an inductor establishing a field in the input circuitry of the radio receiver, no wired connections between the converter unit and the A-M receiver, being required.

The full nature of the invention will be understood from the accompanying drawing and the following description and claims:

Figure 1:
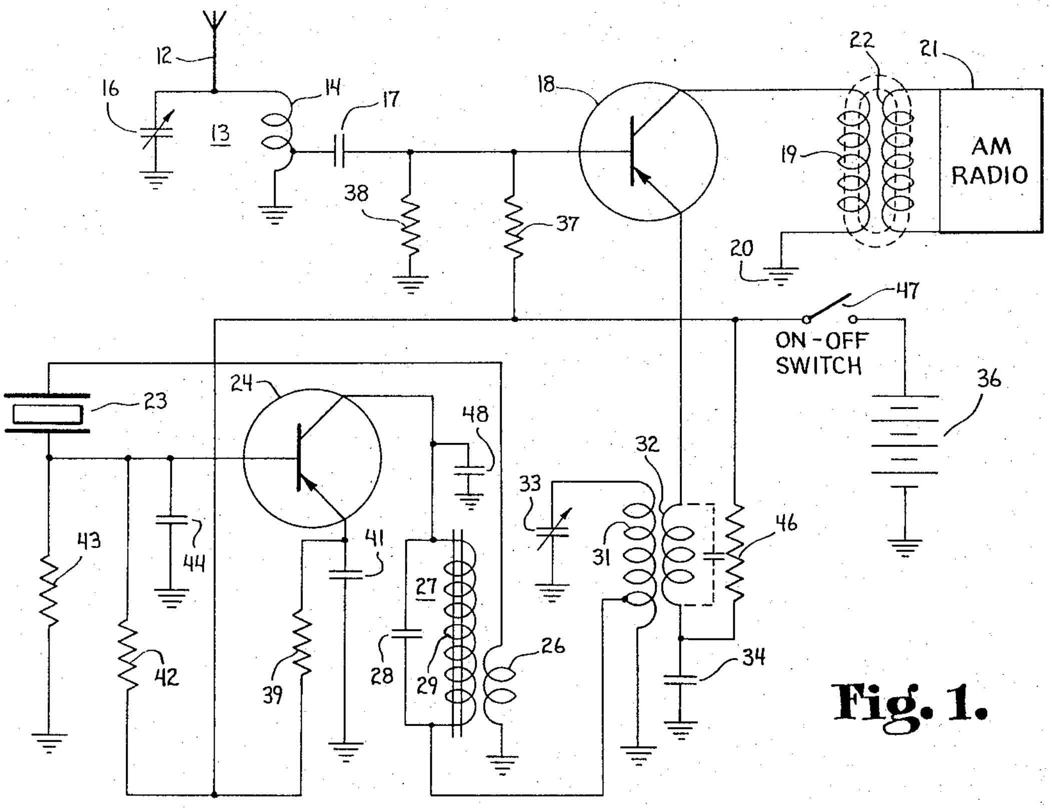
FIG. 1 is a schematic diagram of the circuit of the present invention.
Figure 2:
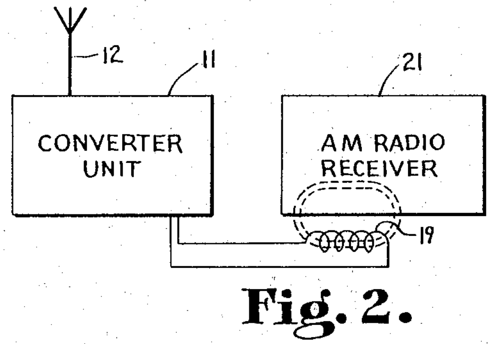
FIG. 2 is a block diagram showing the converter unit and A-M radio receiver as separate units with an inductive coupling therebetween.

Referring now to the drawings in detail, the converter unit 11 has antenna 12 mounted thereon which may be a typical metal telescoping rod antenna. This antenna is connected to an input circuit 13 including the coil 14 and variable condenser 16, this circuit being tuned to the F-M radio frequency of interest. For example, if it is desired to hear police calls on the A-M radio, and the police radio frequency is 155.01 megacycles, the input circuit 13 is tuned to this frequency.

The output of circuit 13 is coupled through capacitor 17 to the base electrode of the combination RF amplifier and mixer transistor 18.

An output inductor 19 is connected between the collector of transistor 18 and ground. This inductor can be a simple antenna coil such as is typically used in transistor radio antennas, for example, although other coils can be used as well. It provides the output from the converter unit itself to the standard A-M radio receiver 21, which is shown in FIG. 1 as having an input coil 22 in the field of coil 19.

A crystal control oscillator is provided in the converter unit and includes the crystal 23 having one side coupled to the base of the oscillator transistor 24 and the other side coupled to the coil 26. The collector of transistor 24 is connected to the tank circuit 27 including the capacitor 28 and slug tunable coil 29, the latter being inductively coupled to the coil 26 or the frequency control. The oscillator output from tank circuit 27 is coupled through the coil 31 to the coil 32 in the emitter circuit of transistor 18. A trimmer capacitor 33 is connected in parallel with the coil 31, the lower ends of both being connected to ground. The lower end of coil 32 is also connected through capacitor 34 to ground 20.

To complete the circuitry of the converter unit itself, a direct current supply is provided from the battery 36 having its negative terminal connected to ground and positive terminal connected through switch 47 and resistor 37 to the base of transistor 18, resistor 38 being returned from the base of transistor 18 to ground. Similarly, the positive terminal of the battery 36 is connected through resistor 39 to the emitter of transistor 24, there being an A-C connection from the emitter to ground through the capacitor 41. The positive terminal is also connected through resistor 42 to the base of transistor 24, and resistor 43 is connected between the base and ground. Capacitor 44 is also connected between the base and ground. A resistance 46 is provided between the positive terminal of battery 36 and the junction of capacitor 34 with the coil 32. A capacitor 48 is connected between ground and the collector of transistor 24.

The value of the crystal is selected such that the mixing of the oscillator output frequency with the RF frequency of interest in transistor 18 results in an intermediate frequency output to which the A-M radio receiver can be tuned on the broadcast band. For example, when the police radio frequency of interest is 155.01 megacycles, a 51.466 megacycle crystal is selected. The oscillator oscillates at the third harmonic of this crystal frequency resulting in a mixer output frequency on coil 19 of 602 kilocycles. The slug of tunable coil 29 is moved so that the tank circuit 27 peaks at the third harmonic of the crystal frequency.

Examples of values for the various components are as follows:

| | | |
|---|---|---|
| Transistor 18 | | Amperex 2N2089 |
| Transistor 24 | | Amperex 2N2494 |
| Capacitors 16 and 33 | millifarad | 5–20 |
| Capacitors 17, 34, and 41 | millifarad | 001 |
| Resistors 38 and 43 | ohms | 47,000 |
| Resistor 37 | do | 10,000 |
| Resistor 42 | do | 4,700 |
| Resistor 39 | do | 330 |
| Resistor 46 | do | 1,000 |
| Capacitor 44 | millimillifarad | 22 |
| Capacitors 28 and 48 | millimillifarad | 5 |
| Battery 36 | volts | 9 |

In order to use the present invention, it is necessary only to close the switch 47, tune the A-M radio receiver to the output frequency of the converter unit itself, and locate the output coil of the converter unit close enough to the radio receiver to couple the signal thereto. In the disclosed embodiment, distances up to eight inches from the radio receiver produce very good results. This means that the converter unit and even the output coil thereof 19 can be one pocket of a suitcoat, for example, and the radio receiver in another pocket, and still function quite well. Because of the small size and number of parts in the converter unit, it can be made to fit into even a small pocket.

Figure 3:
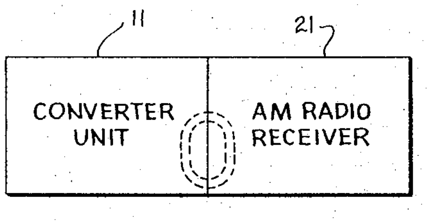
FIG. 3 is a block diagram showing the converter unit and A-M radio receiver contained in the same housing but still maintaining the inductive coupling between the units.

If desired, the converter unit and radio receiver can be incorporated completely in one pocket-size case such as shown in FIG. 3, for example. No direct wire connection between the two is necessary in any event.

The advantage of the present invention to a policeman particularly can be appreciated when it is recognized that a policeman can be directing traffic or can be engaged in some other necessary activity away from the radio receiver in his automobile or motorcycle and still be in constant communication with the police radio dispatcher. Not only is this possible by reason of the present invention, but it is possible at a very low price.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A radio frequency signal receiving system comprising:

an A-M radio receiver having first antenna means for reception of radio frequency signals;

second antenna means for reception of radio frequency signals;

an input circuit connected to said second antenna and tuned to the frequency of an F-M carrier signal to be received;

a first transistor having a control electrode coupled to said input, a collector coupled to an output coil, and an emitter coupled through a second coil to ground;

a crystal controlled transistor oscillator having a crystal therein having a fixed fundamental frequency approximately equal to one-third of said F-M carrier signal frequency, and said oscillator having a tuned output circuit inductively coupled to said second coil to produce a beat frequency output in said output coil, said first transistor functioning as a radio frequency amplifier and mixer;

said output coil being coupled to said first antenna means only by the magnetic field of said output coil, whereby information in said F-M carrier is audibly produced by said A-M radio receiver, said A-M radio receiver and the antenna means thereof being mechanically separate and apart from said second antenna means, said input circuit, said first transistor, said transistor oscillator and said output coil.

2. A radio frequency signal receiving system comprising:

an A-M radio receiver having first antenna means for reception of radio frequency signals;

second antenna means for reception of radio frequency signals;

an input circuit connected to said second antenna and tuned to the frequency of an F–M carrier signal to be received;

a first transistor having a control circuit coupled to said input, and said first transistor having a load circuit with an output coil therein;

a crystal controlled transistor oscillator having a crystal therein having a fixed fundamental frequency approximately equal to one-third of said F–M carrier signal frequency, and said oscillator having a tuned output circuit coupled to said first transistor to produce a beat frequency output in said output coil, said first transistor functioning as a radio frequency amplifier and mixer;

said output coil being inductively coupled to said first antenna means only inductively and exclusive of any mechanical connection therebetween, whereby information in said F–M carrier is audibly produced by said A–M radio receiver.

3. A radio frequency signal receiving system comprising:

an A–M radio receiver having first antenna means for reception of radio frequency signals;

second antenna means for reception of radio frequency signals;

an input circuit connected to said second antenna and tuned to the frequency of an F–M carrier signal to be received;

a first transistor having a control circuit coupled to said input, and said first transistor having a load circuit with an output inductor therein;

a transistor oscillator having an output circuit coupled to said first transistor to produce an intermediate frequency output in said output inductor, said first transistor functioning as a radio frequency amplifier and mixer;

said output inductor being coupled to said first antenna means only inductively and exclusively of any mechanical connection therebetween, whereby information in said F–M carrier is audibly produced by said A–M radio receiver.

4. In a radio frequency signal receiving system the combination comprising:

antenna means for reception of radio frequency signals;

an input circuit connected to said antenna means and tuned to the frequency of an F–M carrier signal to be received;

a first transistor having a control electrode coupled to said input circuit, a collector coupled to an output coil, and an emitter coupled through a second coil to ground;

a transistor oscillator having a tuned output circuit inductively coupled to said second coil to produce an intermediate frequency output signal in said output coil at a frequency tunable in the standard A–M broadcast band, said first transistor functioning as a radio frequency amplifier and mixer;

said output coil being movable independently of said transistor and oscillator into inductively coupled relationship to antenna means of an A–M radio receiver whereby information in said F–M carrier is audibly producible by said A–M radio receiver.

5. A radio frequency signal receiving system comprising:

an A–M radio receiver having first antenna means for reception of radio frequency signals;

second antenna means for reception of radio frequency signals;

an input circuit connected to said second antenna and tuned to the frequency of a carrier signal to be received;

a first transistor having a control circuit coupled to said input, and said first transistor having a load circuit with an output inductor therein;

a transistor oscillator having an output circuit coupled to said first transistor to produce an intermediate frequency output in said output inductor;

said output inductor being mechanically separate and disconnected and apart from said A–M receiver and said first antenna means thereof while said output inductor is inductively coupled to said first antenna means whereby information in said carrier is audibly produced by said A–M radio receiver.

6. The combination of claim 5 wherein said A–M radio receiver is mechanically separate and apart from said second antenna means, said input circuit, said first transistor, said transistor oscillator, and said output inductor.

References Cited

UNITED STATES PATENTS

| | | | |
|---|---|---|---|
| 3,054,058 | 9/1962 | Towler | 325—461 X |

FOREIGN PATENTS

| | | |
|---|---|---|
| 632,917 | 12/1961 | Canada. |

OTHER REFERENCES

Basic Theory and Application of Transistors, Dept. of the Army Technical Manual TM 11–690, 1959, p. 231.

The Radio Amateur's Handbook, 37th ed., West Hartford, Conn., ARRL, 1960, p. 328.

KATHLEEN H. CLAFFY, *Primary Examiner.*

R. S. BELL, *Assistant Examiner.*